US008793049B2

(12) United States Patent
Brozovich

(10) Patent No.: US 8,793,049 B2
(45) **Date of Patent: *Jul. 29, 2014**

(54) VEHICLE DIAGNOSTIC TOOL WITH PACKET AND VOICE OVER PACKET COMMUNICATIONS AND SYSTEMS INCORPORATING SUCH A TOOL

(75) Inventor: Roy Steven Brozovich, Santa Clara, CA (US)

(73) Assignee: Snap-On Incorporated, Kenosha, WI (US)

( * ) Notice: Subject to any disclaimer, the term of this patent is extended or adjusted under 35 U.S.C. 154(b) by 148 days.

This patent is subject to a terminal disclaimer.

(21) Appl. No.: 12/820,909

(22) Filed: Jun. 22, 2010

(65) Prior Publication Data

US 2010/0262335 A1 Oct. 14, 2010

Related U.S. Application Data

(63) Continuation of application No. 11/404,053, filed on Apr. 14, 2006, now Pat. No. 7,769,508.

(51) Int. Cl.
*G01M 17/00* (2006.01)

(52) U.S. Cl.
USPC ........ 701/33.2; 701/29.1; 701/29.3; 701/31.4

(58) Field of Classification Search
USPC ........... 701/29, 33, 35, 29.1, 29.3, 31.4, 31.5, 701/31.8, 33.2, 34.3; 455/411
See application file for complete search history.

(56) References Cited

U.S. PATENT DOCUMENTS 6,330,499 B1 * 12/2001 Chou et al. ...................... 701/33
6,359,880 B1 3/2002 Curry et al.
6,754,562 B2 6/2004 Strege et al.
6,871,409 B2 3/2005 Robb et al.
7,769,508 B2 * 8/2010 Brozovich ...................... 701/29
2003/0020759 A1 1/2003 Cancilla et al.
2003/0036832 A1 2/2003 Kokes et al.
2003/0215128 A1 * 11/2003 Thompson .................... 382/141
2004/0162067 A1 8/2004 Stefani et al.
2004/0172177 A1 9/2004 Nagai et al.
2004/0196826 A1 * 10/2004 Bao et al. ...................... 370/352
2005/0096805 A1 5/2005 Fudali et al.
2005/0193252 A1 9/2005 Cancilla et al.
2005/0235147 A1 * 10/2005 Vaughan et al. .............. 713/167
2005/0275515 A1 12/2005 Morris
2007/0083303 A1 * 4/2007 O'Sullivan et al. ............ 701/29

OTHER PUBLICATIONS

European Search Report issued in European Patent Application No. EP 07106153.5 dated Mar. 7, 2011.

* cited by examiner

*Primary Examiner* — Khoi Tran
*Assistant Examiner* — Spencer Patton
(74) *Attorney, Agent, or Firm* — McDermott Will & Emery LLP

(57) ABSTRACT

In an exemplary vehicle service facility that provides vehicle related sales, maintenance services or the like, a diagnostic tool has wireless packet data communication capabilities. To support voice communication, the tool also has one or more audible input/output transducers and a vocoder, and is configured to use VoIP technology or the like to enable wireless packet data transport of voice calls over the same wireless data links. The packet voice capability can support voice communications with technicians using other tools at the facility or with personnel in an office at the service facility. If the facility has a data link to a wide area packet network, like the Internet, the packet voice capability may also support voice communications with other parties having packet service. Examples are technicians at other locations or various personnel of technical support services for the tools or for different types of vehicles.

10 Claims, 3 Drawing Sheets

VEHICLE DIAGNOSTIC TOOL WITH PACKET AND VOICE OVER PACKET COMMUNICATIONS AND SYSTEMS INCORPORATING SUCH A TOOL

RELATED APPLICATIONS

This application is a Continuation of U.S. application Ser. No. 11/404,053, filed on Apr. 14, 2006, now U.S. Pat. No. 7,769,508, the entire contents of each of which are hereby incorporated by reference.

TECHNICAL FIELD

The present subject matter relates to vehicle diagnostic tools having added voice communication capability using voice over packet communication techniques, and vehicle service facility systems and networks configured for data and voice communications with such tools.

BACKGROUND

In recent years, advances in computers and communications have moved into the realm of the auto shop. Increasingly sophisticated processor based tools may be found throughout auto body and auto maintenance facilities, and today, more and more of those devices communicate data back and forth with other similar devices and/or with host computers and various remote terminals. The communications facilitate diagnostics and repair as well as communications with office equipment, e.g. to facilitate order processing and invoicing for completed work.

However, data communications are not the only form of communications needed on the premises of such vehicle service facilities. A variety of situations arises where a person in one part of the facility needs to call or talk to a person in another part of the building or on another part of the property. When the front office needs to communicate with a technician in the shop, for example, the person in the office will often walk out to the shop bay or have the technician come into the office. If the building has an intercom or the like, the person in the office may be able to call or talk to the shop technician on the intercom. Either method disrupts work, of that of the service writer in the office or of the shop technician to answer a page.

A need still exists for improved communication capabilities for application in vehicle service facilities and the like, where vehicle diagnostic tools are used.

SUMMARY

The teachings herein provide improved communications, by adding voice communication capabilities in a vehicle diagnostic tool, e.g. to enable the user of the tool to communicate with users of data processing systems in the facility or with parties that may be reached via a broader area data network. The voice communications ride on packet transport, that is to say via the packet transport network used for data communications to and from the diagnostic tool in the vehicle service facility.

The examples discussed below utilize a vehicle diagnostic tool that includes a diagnostic instrument for obtaining diagnostic data from a vehicle, a processor for processing vehicle diagnostic data obtained by the instrument, and at least one audio transducer for audible input and output. A wireless data transceiver, controlled by the processor, provides wireless packet data communication. The wireless packet data communication by the transceiver supports data communications to or from the processor relating to at least one application of the diagnostic instrument. The wireless packet data communication by the transceiver also supports wireless packet transport of audible communication information, for the at least one audio transducer, to or from a remote communication device.

Hence, an example is disclosed of a vehicle diagnostic and communication system for a vehicle service facility, which includes a data communication network and a computer for use by office personnel. The office computer has a packet data communication interface coupled to the data communication network. The computer also includes a first audible input/output means. The computer is configured to provide two-way communication of audible information to and from the first audible input/output means over the data communication network. A wireless access point is coupled to the data communication network. The system also includes at least one vehicle diagnostic tool. The tool includes a diagnostic instrument for obtaining diagnostic data from a vehicle, a processor, a wireless packet data communication interface for data communication via the wireless access point, and second audible input/output means. The processor is configured to enable the tool to perform two-way packet communication over the data communication network via the wireless interface and the wireless access point. These communications are for both data relating to at least one vehicle diagnostic service involving operation of the diagnostic instrument and packetized audible information for the second audible input/output means, which enables voice communication for a user of the vehicle diagnostic tool with the office personnel via the data communication network.

The disclosure below also envisages a diagnostics and communication technique. Such a technique might involve obtaining a measurement of a parameter of a vehicle, with a vehicle diagnostic tool, as well as communicating over a wireless packet data communication link, to or from the vehicle diagnostic tool. The technique also entails communicating voice information for a user of the vehicle diagnostic tool, via the communication over the wireless packet data communication link.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
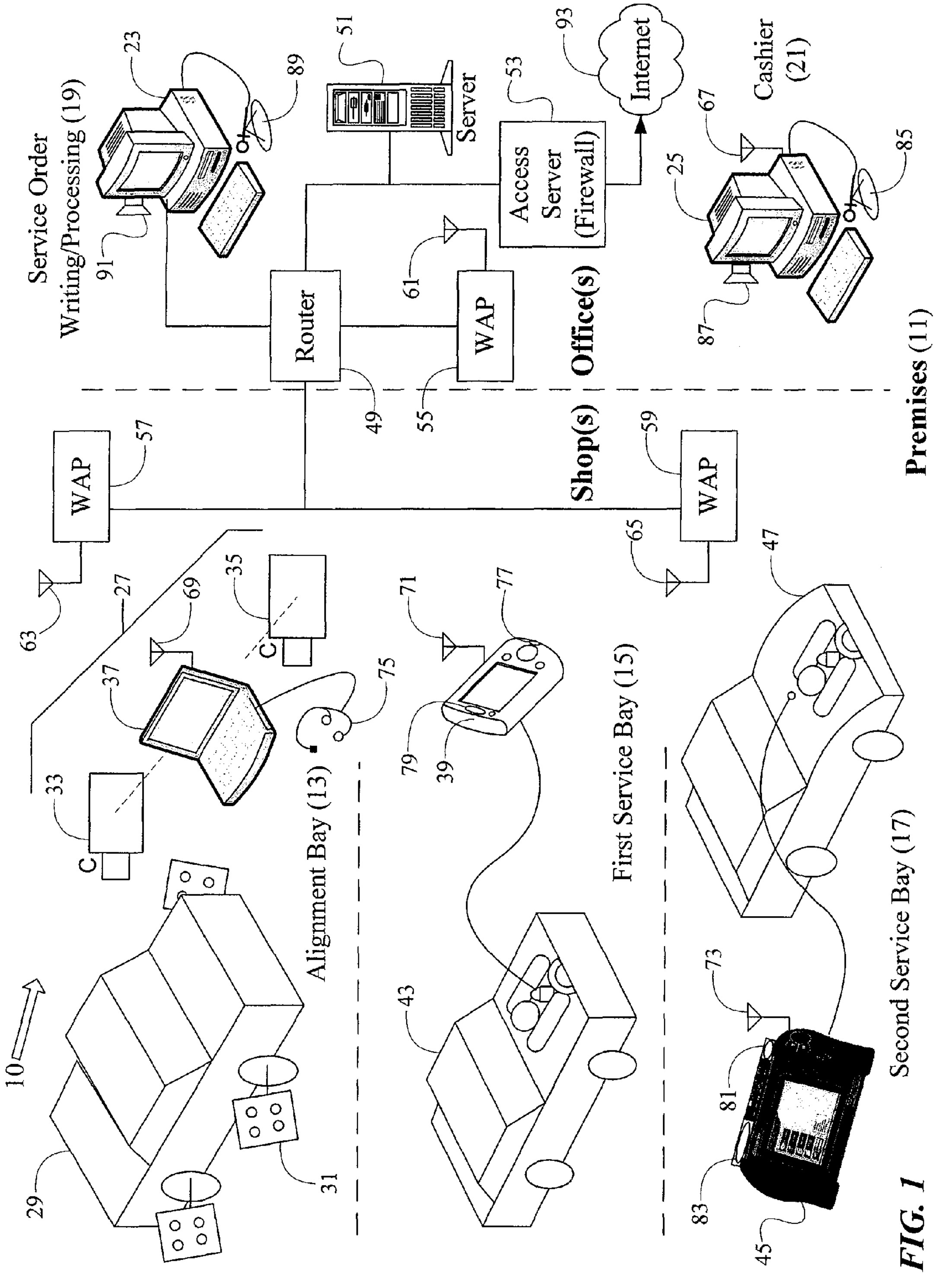
FIG. 1 is a high-level functional block diagram of a system including diagnostic equipment, data processing equipment and a communications network, as might be installed in an automotive or other vehicle service facility.

Reference now is made in detail to the examples illustrated in the accompanying drawings and discussed below. FIG. 1 illustrates the functional elements of an exemplary system 10 for use within the premises 11 of a vehicle "service facility" that provides vehicle related sales, maintenance services or the like, using one or more vehicle diagnostic tools. The various examples disclosed herein relate to improved communications, by adding voice communication capabilities in a vehicle diagnostic tool, e.g. for communication with users of associated data processing systems on the premises 11 or with parties that may be reached via a broader area data network. The voice communications ride on packet transport, that is to say using a packet data transport network used for data communications within the particular vehicle service facility.

The typical facility will have one or more offices and one or more shops or vehicle service bays within one or more buildings on the premises, although service work using diagnostic tools also may be performed at outside locations on the premises. The teachings discussed herein are applicable to virtually any service facility premises in which a vehicle diagnostic tool may be used, which may also have data communications. For purposes of illustration and discussion, the example shows a premises 11 in which the shop portion of the facility 11 includes three bays 13-17. One bay 13 is for vehicle wheel alignment and related services. In the example, the shop also includes two general service bays 15 and 17. The illustrated offices include an office 19 for one or more persons to write and/or otherwise process service orders relating to work done in the bays. The illustrated offices also include an office 21 for a cashier.

Although the offices may have a wide variety of other equipment, in the example, each office is equipped with a computer, such as a desktop type personal computer (PC). Hence, there is a PC 23 in the service order office 19, and there is a PC 25 in the cashier's office 21.

The bay 13 contains a vehicle wheel alignment system, in this case an image processing type system 27, for use in taking wheel alignment measurements and other measurements from a vehicle 29 when under test by the system 27. The image based aligner system 27 typically consists of three principal components. A first principal component of the image processing type aligner system 27 is a set of passive heads 31, for mounting to wheels of the vehicle 29. Each head includes a wheel-rim clamp and an attached target object. In the example, each target object has a planar surface with a plurality of visually perceptible, geometrically configured, retro-reflective target elements, which appear as a pattern of reflective circles or dots of different sizes on the planar surface.

A second principal component of the image processing type aligner system 27 is an image capture system, typically in the form of one, two, three or more modules containing cameras and associated target illumination devices. For purpose of explanation, the illustrated system 27 includes two such modules 33 and 35. Each of the imaging modules 33, 35 includes a light emitter or illumination system (typically a strobe). Each of the imaging modules 110, 112 also includes an image sensor, such as a high-resolution digital camera. Essentially, each camera forms an image of objects within its field of view, which in operation includes at least a portion of one or more illuminated targets on passive heads 31 when mounted on wheel(s) of the vehicle 29. In response to the image, each camera generates digital image data.

The third principal component of the aligner system 27 is a programmed computer or host 37, typically a personal computer (PC) or similar programmable data processing device. Although the PC could be a desktop or a handheld model, in the example, the PC 37 is a laptop.

In a typical implementation, the computer 37 includes a processor, a keyboard, a mouse or touchpad or other cursor and selection device, a printer and a color display monitor. For the wheel alignment application, the PC type computer 37 includes a data interface configured to receive image data from the imaging modules 33 and 35, and the PC is programmed to process the received image data to calculate one or more alignment related parameters of the tested vehicle 29. The computer 37 also provides a graphical user interface, including display of the measured vehicle parameter(s) to a technician that is using the system 27. In general, the host computer 37 processes the image data to derive positional data regarding position of the visually perceptible target elements from the camera images. The host computer 37 processes the positional data to determine one or more wheel alignment parameters of the vehicle 29 under test. The computer 37 also offers a variety of other information useful in adjusting vehicle alignment and provides the user interface for operation of the system 27.

The computer 37 maybe a form of vehicle diagnostic tool, in this example, because it is configured for the wheel alignment application. The alignment system as a whole also may be a form of vehicle diagnostic tool.

An example of a commercially available image processing type vehicle wheel aligner is the Visualiner 3D or V3D system, available from John Bean Company, Conway, Ark., a division of Snap-on Corporation.

Those skilled in the art will recognize that other types of alignment system technology could be used in the alignment bay 13. The packet transport of voice communications discussed below may be applied to the illustrated system 27 as well as to other types of alignment technologies that utilize computer or processor based technologies, analogous to the computer 27, that can support packet data communications.

The illustrated example of the premises 11 includes first and second service bays 15 and 17, that provide other types of vehicle diagnostics and services. In the first bay 15, for example, a service technician operates a tool 39 to take measurements from an engine 41 of a vehicle 43 that is under test in that bay. There is a variety of different types of processor based equipment that may be used as the tool 39. Examples include engine analyzers, digital volt-ohm meters (DVOMs), laboratory oscilloscopes etc. Measurement devices may also include gas analyzers and the like.

Another example of a diagnostic instrument, used is an interface for "scan tool" or "scanner" type diagnostic applications. The scanner type data interface communicates with one or more on-board controllers in a vehicle, via a vehicle communication bus, usually tapping into the bus at a connection point located beneath the dashboard or a seat. When a vehicle is brought in for repair or a checkup, the tool implementing the scanner application via such an interface is used to help diagnose or discover any problems in the various systems of the vehicle that are monitored by the vehicle's on-board controller(s). In the example, the tool 45 in the bay 17 operates as a scanner to receive, process and display data regarding one or more elements of a vehicle 47 from a controller on-board that vehicle.

Commercially available examples of vehicle diagnostic tools include the MODIS™ diagnostic tool from Snap-on Diagnostics, Inc., San Jose, Calif. which has a plug-in DVOM module, a scanner module and a lab scope accessory; a Snap-On® Vantage™ which is a stand alone lab scope tool; and a Snap-On® Solus™ tool which is a stand alone vehicle scanner. Of course a wide range of other known diagnostic tools can be upgraded with wireless communication capabilities, voice input/output and VoIP processing.

The illustrated office computers and the diagnostic tools in the various bays all have data communication capabilities. To facilitate exchange of data and the various applications that rely on data communications, the premises 11 have a packet data communication network, typically a local area network (LAN). Assume for discussion that the network utilizes available Ethernet technologies for wired and wireless communications, although those skilled in the art will recognize that other technologies may be used to transport packetized information, both for data applications and audio/voice communications.

In the example, the LAN on premises 11 includes at least one Ethernet switch/router 49. One or more of the devices on the premises 11 may connect to the router 49 via Ethernet cabling. Hence, in the example, the computer 23 in the order processing office 19 includes an Ethernet card that connects by Ethernet cable to the router 49. Other central data processor and/or packet data communication equipment, represented in the example by the server 51 and the access server 53, may connect to the router in a similar fashion.

However, other equipment in the premises 11 utilizes wireless packet transport. For that purpose, the Ethernet based network may include one or more wireless access points (WAPs) connected to the router 49. FIG. 1 shows three WAPs, one 55 located to serve office equipment such as the computer 25 in the cashier's office 21 and two 57, 59 located to provide wireless packet communications to and from the tools in the shop bays. Each WAP 55, 57 or 59 includes an appropriate Ethernet interface for communications over Ethernet cabling with the router 49 as well as a wireless transceiver for communication via the respective antenna 61, 63 and 65.

The office computer 25 may include a compatible wireless transceiver in the form of an integral or plug-in type client adapter, for radio-frequency (RF) communication through the associated antenna 67 and over the air link with the antenna 61 and WAP 55. In the alignment system 27, the computer 37 similarly may include a wireless client adapter, for RF communication through the associated antenna 69 and over the air link with the antenna 63 and WAP 57. Although the precise implementation may vary from tool to tool, the tools 39 and 45 in the other bays may also include wireless Ethernet transceivers and antennas 71 and 73, respectively, which provide wireless transport for packet signals over the air with the antenna 65 and WAP 59.

A packet-switched network, such as that used on the premises 11, routes each packet individually through the network, although not necessarily through a common path. Packet switching uses a standard packet protocol, such as the Internet Protocol (IP). In a LAN, the router and the WAPs provide transport of the IP packets on or within frames in the particular LAN protocol, that is to say in Ethernet frames in the example.

In recent years, as the speeds of packet-switched communications equipment and the speed of processors have increased, a variety of applications have emerged that utilize packet transport as an alternative bearer for voice communications. Where the packet transport uses IP, such applications are often referred to as "Voice over IP" or "VoIP" services. Although originally developed for wireline network transport through the Internet and through wireline intranets, VoIP services in fact may be used on any type of network that offers IP transport. In other words, VoIP is applicable to local area networks (LANs) that provide IP transport, including wireless LANs or LANs having some wireless segments, as are now appearing in vehicle sales and service facilities such as the LAN or the premises 11 in the example.

The examples of "voice over data-packet" applications described herein are voice over Internet Protocol or "VoIP" type applications. However, the "voice over data-packet" terminology is intended to cover VoIP as well as other types of audio communications over other packet protocols adapted for packet-switched data communications.

The system 10 takes advantage of VoIP communications or similar packet transport of audio information in order to enhance the communications to and from technicians in the shop bays, particularly with personnel in the offices. For that purpose, each of the diagnostic tools 27, 39 and 45 includes at least one voice input/output transducer. As will be discussed in more detail with regard to an example shown in FIG. 2, each tool includes an element to convert between analog audio signals and digitally encoded audio data, and the processor or other circuitry is configured to encapsulate and de-encapsulate such data in and from IP packets, that is to say, for VoIP type transport. In this way, the processor and transceiver in each tool are configured to provide two-way packet communication over the data communication network, via the wireless interface and the wireless access point, for packetized audio information for the audible input/output transducer, to enable two-way voice communication for a user of the respective vehicle diagnostic tool.

Hence, the host computer 37 of the wheel alignment system 27 may have an attached headset 75. Of course, the system could use a wireless link between the computer 37 and the headset. Typically, the headset 75 may include a microphone and a speaker and is worn by a user, at least when carrying on a conversation. The microphone receives an audible input from the person wearing the headset 75, and the speaker or other earpiece transducer provides audible output of information to the person wearing the headset 75. PC type computer implementations of diagnostic tools of course can use any of a variety of other types of audio input and output means. The computer 37 includes an interface to the headset 75 (or other audio transducers) for two-way conversion of audio between digital and analog, and the CPU of the computer runs compression and decompression software and associated packet interworking software, to enable two-way packet communication of compressed digital audio data for the audio information coming from or going to the headset 75.

In the example, the vehicle diagnostic tool 39 in use in the first service bay 15 includes a microphone 77 near the top of its front face and a speaker 79 located near the bottom of the tool. The microphone 77 and speaker 79 may be similar to those used in cordless telephone handsets or in cellular telephones or the like, and for voice communications, the technician can use these input/output elements on the tool 39 in a manner analogous to using such a handset or cell phone. The microphone 77 and speaker 79 provide audio input and output to/from an interface for two-way conversion of audio between digital and analog. Circuitry within the tool 39 performs compression and decompression; and the tool processor or another circuit software performs the associated packet interworking software, to two-way packet communication of digitized and compressed audio data for the audio information coming from the microphone 77 or going to the speaker 79.

The exemplary vehicle diagnostic tool 45 in use in the second service bay 17 includes a microphone 81 and a speaker 83. Here, the microphone 81 and speaker 83 are similar to those used for a speaker phone in many modern telephone sets. The microphone 81 and speaker 83 provide audio input and output to/from an interface for two-way conversion of audio between digital and analog, although for speaker phone operation, the interface circuitry will typically provide additional amplification and filtering. A processor or other circuitry within the tool 45 performs compression and decompression software on the digitized audio data and associated packet interworking, to enable two-way packet communication of compressed digital audio data for the audio information coming from the microphone 81 or going to the speaker 83.

To facilitate voice communications for office personnel, each of the office computers 21 and 23 includes at least one transducer providing audible (usually voice) input/output. In a PC type implementation, the audio input/output means typically take the form of a microphone and one or more loudspeakers (or plug-in earphones), although analogous audio transducers or even combined input and output transducers may be used. Hence, in our example, the office computer 25 is connected to a microphone 85 and includes or connects to a speaker 87. Additional speakers, if any are omitted for convenience. Similarly, the office computer 23 is connected to a microphone 89 and includes or connects to a speaker 91. Additional microphones or the like also could be provided for audio input. Each office computer includes an interface to the associated microphone and speaker(s) for two-way conversion of audio between digital and analog, and the CPU of the computer runs compression and decompression software and associated packet interworking software, to enable two-way packet communication of compressed digital audio data for the audio information coming from the microphone or going to the speaker(s).

In the example, system 10 includes one or more servers 51 coupled to the data network. Each of the various tools and office computers can communicate with any server in a 'client-server' manner, including the local server 51. This arrangement supports a number of data applications, such as database storage and access for service and accounting records, document storage and retrieval, e-mail and the like. Although peer-to-peer communications between the tools and the office computers are possible, for some applications it may be helpful for the devices to work through a network server 51 in order to initiate or establish the peer-to-peer communications. In a similar fashion, VoIP based communications between the tools 27/37, 39, 45 in the shop bays and/or with the office computers 23, 25 (or even between the office computers) can use peer-to-peer IP communications. However, many implementations may utilize a call set-up server program running on a network computer 51 to help initiate telephone like voice communications between users of the various voice enabled data devices.

A number of different protocols for VoIP call processing and transport have been developed and deployed to varying degrees and/or for different applications. Examples of such protocols, one or more of which might be used for VoIP communication in the system 10, include the International Telecommunications Union's H.323 suite of protocols, the Session Initiation Protocol (SIP), and the Media Gateway Control Protocol (MGCP).

The VoIP communications capabilities enable personnel in the offices 19, 21 to communicate with personnel in the shop bays 13-17 via the various diagnostic tools. Voice communications also may be conducted between personnel in the different offices or between personnel in different bays.

In system 10, communication access to a public wide area data network, typically the public Internet 93, may be provided through the access server 53. The server 53 is linked to the router 49 and provides the physical access connection between the data network within the premises 11 and an Internet Service Provider (ISP) that provides connectivity to the Internet. Theoretically, the server could use or incorporate a dial-up modem, but typically, the server 53 and ISP provide broadband packet data communication capabilities. The server 53 provides any protocol translations necessary between the protocols of the LAN and those of the ISP link(s). The access server 53 or an associated device typically provides security for the LAN environment, in the form of a firewall or the like.

The two-way packet data communications via the access server 53 support a wide range of data applications, such as e-mail and electronic communications in support of transactions for sales or services, e.g. credit card verification and the like. The data communications also support various applications relating to the vehicle services conducted in the premises, such as downloads of data regarding new vehicle models, downloads of software for the various diagnostic tools, relevant on-line web research, on-line help or tech-support for data equipment and diagnostic tools or for vehicles, etc.

The two-way packet data communications via the access server 53 may also support VoIP based audio communications. Such extended area VoIP communications, for example, may provide communications outside the premises for a vehicle diagnostic tool in one of the shop bays, say one of the tools 27/37, 39 and 45 or for one or more of the office computers 23 and 25. The connection to the public Internet 93 via the access server 53, for example, may provide communications between any of the vehicle diagnostic tools on the premises and any over device that may be reached via the Internet 93. Voice communications for users of the diagnostic tools, for example, may allow them to talk to other technicians in similar vehicle service facilities and/or with technical support personnel of the company or companies that provide the tools or with technical support personnel of various vehicle manufacturers.

Figure 2:
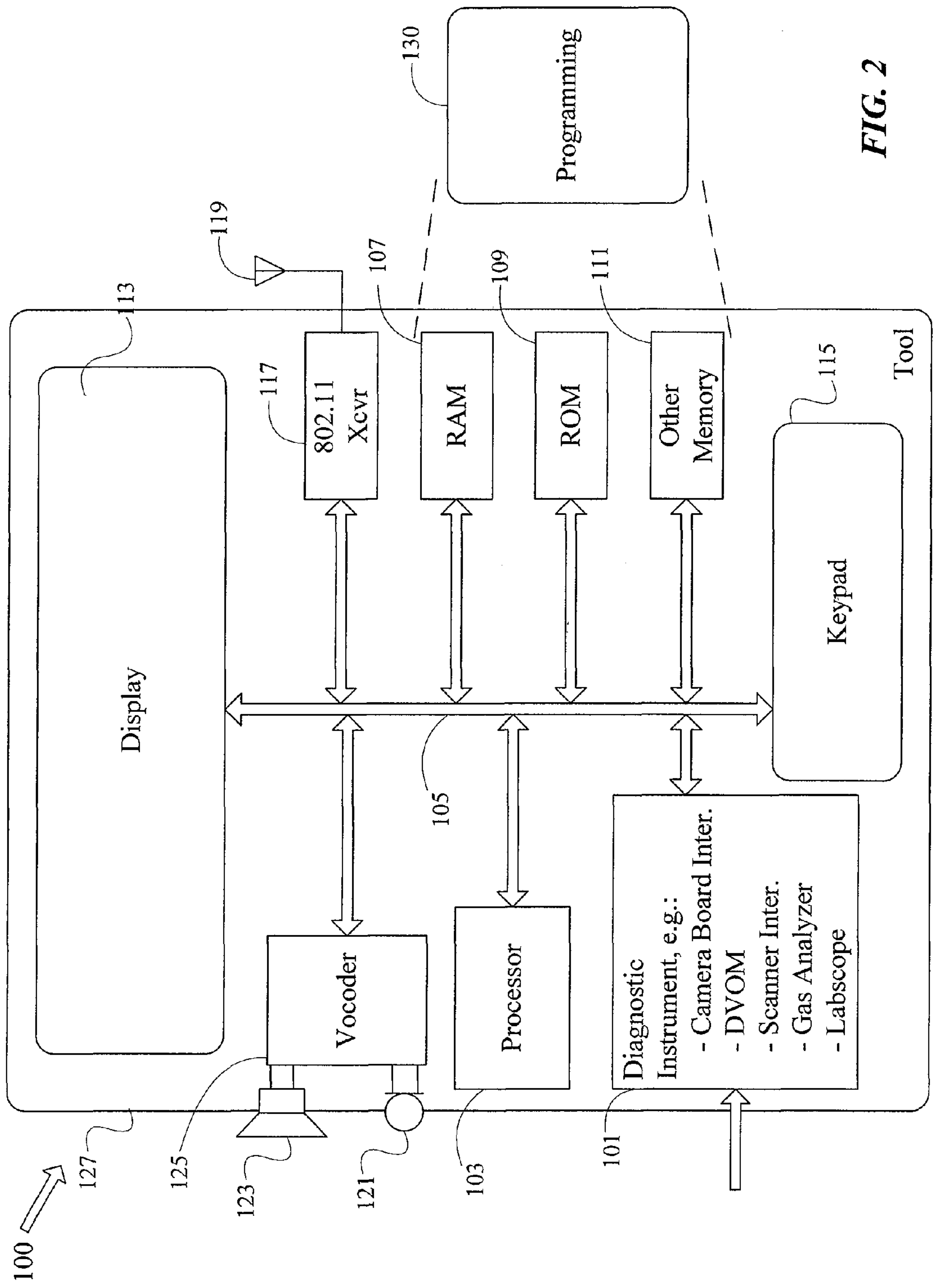
FIG. 2 is a functional block diagram of an example of a vehicle diagnostic tool with voice and data communication capabilities.

FIG. 2 is a functional block diagram of a vehicle diagnostic tool 100. The illustrated tool is intended as a generic representation, and those skilled in the art will recognize that elements such as those of the tool 100 may be used to implement the tool 37 (of system tool 27), the tool 39 and the tool 45 discussed above relative to FIG. 1 and other similar vehicle diagnostic devices.

The tool 100 includes a diagnostic instrument 101, for obtaining diagnostic data from a vehicle under test. One example of such a diagnostic instrument 101 is an interface for receiving image data from an image sensor, as might be used in the host computer 37 in the vehicle wheel alignment system 27. Another example of such a diagnostic instrument 101 is a digital volt-ohm meter (DVOM), as might be used in the vehicle diagnostic tool 39, in the system 10 of FIG. 1. Still other examples of the diagnostic instruments 101 include a data interface for scanner communication with one or more on-board controllers in the vehicle, a gas analyzer and a laboratory oscilloscope (labscope), as might be used to implement the combined diagnostic tool 45, in the system of FIG. 1.

As shown in FIG. 2, the vehicle diagnostic tool 100 also includes a processor 103, for processing vehicle diagnostic data obtained by the diagnostic instrument 101. The processor 103 communicates with the diagnostic instrument 101 and other elements of the tool 100 via an internal bus 105 or the like. The processor 103 typically is a microprocessor or other similar programmable device, which controls overall operations of the tool 100. The microprocessor and/or an associated processing circuit (not separately shown) process vehicle diagnostic data obtained by the diagnostic instrument 101 in accord with programming stored in memory in the tool.

The memory of the vehicle diagnostic tool 100 generally includes both volatile memory (e.g., RAM 107) and non-volatile memory (e.g., ROM 109, PCMCIA cards, etc.). The tool 100 may include other forms of memory 111. In a handheld implementation, such as for tool 49 or tool 45, the additional memory 111 might be a flash memory or the like. In a laptop or desktop PC type implementation such as the computer 37, the additional memory 111 might be a hard disk drive, a CD-ROM, video-ROM or floppy disk drive or various combinations thereof.

The vehicle diagnostic tool 100 also has a display 113, and a user data input mechanism such as a keypad, a touch-sensitive screen, a track ball, a touch-sensitive pad, a QWERTY keyboard, or the like. In the example, the user data input mechanism takes the form of a keypad 115. The user operates the keys of the keypad 115 to input information to the diagnostic tool 100; and the user can observe output information on the display screen 113.

The vehicle diagnostic tool 100 further includes a wireless data transceiver 117, for wireless packet data communication, via an associated antenna 119. The transceiver 117 can be any appropriate wireless data transceiver, for providing two-way packet communications over an air-link to a base station transceiver, such as might be implemented in one of the WAPs. Typically, the transceiver 117 may be a wireless LAN type transceiver, such as an IEEE 802.11 (wireless Ethernet) transceiver, although other technologies such as Bluetooth technology or Ultra-Wideband (UWB) technology could be used.

In the illustrated example, the processor 103 encapsulates data in packets, typically Internet Protocol (IP) packets, and it receives similar packets from which it recovers data for use within the tool 100, based on execution of a portion of its programming instruction set. For diagnostic applications, the processor 103, transceiver 117 and antenna 119 provide two-way packet data communications, with the computers 23, 25 in the offices 19, 21, with other diagnostic devices such as 37, 39 or 45, with any server equipment 51 in the service facility premises 11 and via the access server 53 with virtually any data device that may be available via the public Internet 93. A variety of uses of this type of data communications, relating to vehicle diagnostics, maintenance and repair, is known.

The vehicle diagnostic tool 100 also offers audio communication capabilities, typically for two-way speech communication, using the same wireless packet data communications via the transceiver 117 and antenna 119. For such audio communications, the tool 100 further includes at least one audible input/output transducer. In the example, the audible input/output transducer takes the form of a microphone 121 and a speaker 123, although analogous audio transducers or even combined input and output transducers may be used.

The microphone 121 receives audible inputs and produces responsive audio frequency electrical signals, and the speaker 123 provides audible outputs in response to audio frequency electrical signals. The microphone 121 and speaker 123 connect to voice coding and decoding circuitry (vocoder) 125. The vocoder 125 converts audio signals from the microphone 121 into digital form, and if desired provides specified encoding, typically data compression. The vocoder 125 supplies the encoded digital audio information over the bus 105, e.g. to the processor 103 for packet encapsulation and transmission via the transceiver 117. The vocoder 125 receives digital audio information over the bus 105, e.g. after de-encapsulation of packetized audio by the processor 103. In response to received digital audio information, the vocoder 125 decodes the information (e.g. decompresses it) and converts the information from digital to analog form to drive the speaker 123 to output receive audio in an audible form.

For audio communication applications, typically conversational speech, the processor 103, transceiver 117 and antenna 119 provide two-way packet data communications of encapsulated digital audio information. Although other packet formats are known, because IP packet transport has become so common, most implementations will involve IP packet communications of the audio information, commonly referred to as "voice over IP" or "VoIP" communications. The packet transport allows voice communication over the data network within the premises, e.g. between technicians in the various bays and/or between technicians in the bays and personnel in the office(s). If the network installation includes a form of access server 53 providing access to the Internet 93, packet transport allows voice communication between technicians and devices (not shown) on the Internet 93 that have VoIP capabilities. In some cases, such devices may even provide remote gateway capabilities for extending telephone calls out onto the public switched telephone network.

The vehicle diagnostic tool 100 may have a variety of different types of housing 127. The housing 127 defines the desired form factor, three examples of which appear in FIG. 1 (at 37, 39 and 45). Many of the housing designs will facilitate handheld use of the vehicle diagnostic tool 100. The microphone 121 and speaker 123 may be arranged on the housing 127 to allow use of the tool like a telephone handset for voice communications, similar to the arrangement on the tool 39. If the tool includes sufficient amplification/filtering in association with the audio input/output transducer(s), then the microphone 121 and speaker 123 may be arranged on the housing 127 to allow operation as a speaker-phone for voice communications, similar to the arrangement on the tool 45. The diagnostic tool 100 may also be configured in a manner similar to a PC, such as the laptop PC 37 as used for the host computer of the wheel alignment system 27 in the bay 13 in the example of FIG. 1. Of course, a variety of other handheld and laptop form factors may be used for the various different types/applications of vehicle diagnostic tools, and those skilled in the art will understand that the illustrated form factors are only discussed here as but a few possible examples.

The representative vehicle diagnostic tool 100 is a programmable device. The processor 103 executes program instructions shown generally at 130, from one or more of the memories, to control the various operations/functions of the tool 100, including for applications related to vehicle diagnostics or service, related data communications and voice communications to and from the tool 100. Typically, an operating system is resident in the memory and executes on the processor 103. The operating system provides a graphical user interface that presents applications and various data on the display 113 and receives user inputs via the keypad 115. The operating system enables execution of applications resident in the memory, both for local functions and for communications using the transceiver 117, including diagnostic and service related applications/communications and for support of voice communications. For voice communications purposes, the application(s) may control the encoding and decoding by the vocoder 125 as well as the packet encapsulation and de-encapsulation for wireless packet data communication via the transceiver 117. Of course, the tool software may include a variety of other applications, e.g. for e-mail, voice or data based instant messaging, browsing the world wide web, document processing, etc.

In the example, the functions relating to IP packet encapsulation and de-encapsulation are performed by the processor 101. Those skilled in the art will recognize that one or more separate circuits, controlled by the processor 101, may be provided in or coupled to the vocoder 127 for performing these packet-related processing functions.

In the example, the programmable diagnostic tool is controlled by execution of programming 130 on processor 103. The executable code of the programming typically resides in one or more of the memories 107-111 and is uploaded to the processor 103 for execution with any data that is to be processed in accord with the instructions. The operations of the vehicle diagnostic tool 100 may be carried out by execution of program code 130 in the form of software, firmware, or microcode operating on processor 103 of any type. Additionally, code for implementing such operations may be in the form of one or more computer instructions in any form (e.g. source code, object code, interpreted code, etc.) stored in or carried by any computer or machine readable medium.

Those skilled in the art will understand that the programming 130 may be implemented in a variety of different ways. However, it may be helpful to consider a high level example, with regard to the functional block diagram of FIG. 3.

The programming 130 for execution by the processor 103 of the tool 100 includes the operating system 131. The operating system may be a conventional operating system for a handheld or embedded device, such as Microsoft Windows CE or Windows Mobile (which are commercially available from Microsoft Corp.). The operating system 131 provides a graphical user interface (GUI) 133 that presents applications and various data on the display 113 and receives user inputs, e.g. via the keypad 115 or other input device. The operating system 131 enables execution of various applications resident in the memory, several of which are shown in the example.

The programming 130 for the tool 100 may include at least one vehicle diagnostic application 135 relating to operation of diagnostic instrument 101. The application 135 may provide a shell specifically adapted to perform the diagnostic functions of the particular tool and perform related data processing and provide related specifically designed input and output functions.

Execution of the application 135 enables the tool to obtain diagnostic data from a vehicle. Hence, at least a portion 137 of the vehicle diagnostic application 135 relates to 'local' functions, such as receipt of data form the instrument 101 and processing of the diagnostic data for display via the GUI 133 and the display device 113. Typically, the local functions may also control functions responsive to user data inputs, when the tool is taking measurements or receiving data via the diagnostic instrument. Depending on the complexity of the tool and its functions, this local control programming may further process the diagnostic data from the instrument 101, e.g. to help identify vehicle problems and/or propose remedial action.

The vehicle diagnostic application 135 may also includes a data communication module 139. Execution of the module 139 by the processor 103 enables the processor to implement and control the communication of data to and from the vehicle diagnostic application 135 via the wireless packet data transceiver, in this case, the transceiver 117 via lower level elements of the programming 130. This data communication relates in some way to operation of the diagnostic instrument. Execution of the application 135 and the communication module 139 might, for example, allow downloading of work orders for display to the technician or allow the technician to send diagnostic data or other types of data from the tool 100 to a remote computer.

The operating system 131 also provides a packet protocol stack, in the example, in the form of a TCP/IP stack 141. The stack 141 formats and encapsulates data from higher level programming, e.g. from the data communication module 139 of the diagnostic application 135, for packet transport. In the opposite direction, the TCP/IP stack 141 recovers data from received packets, formats the data if necessary, and supplies the data to higher level programming, e.g. to the data communication module 139 of the diagnostic application 135.

The programming 130 for execution by the processor 103 of the tool 100 also includes a transceiver control routine 143, adapted to control transmission and reception through the transceiver 117. In the illustrated example, the transceiver is a wireless Ethernet type client adapter or the like, therefore the control programming allows the processor to control operations of the transceiver 117 in accord with the applicable section of the 802.11 standard, e.g. 802.11a, 802.11b or 802.11g. The transceiver control software 143 effectively controls the lower layer operations and provides handoff of communicated information in IP packet form, to and from the next higher layer programming, which in this case is implemented by the TCP/IP protocol stack 141.

The tool 100 also provides voice over packet communications using VoIP technology. Hence, in the example, the programming 130 for execution by the processor 103 of the tool 100 also includes one or more VoIP applications 145. Execution of the application(s) 145 by the processor 103 enables the processor to implement and control the communication of voice information to and from the microphone coming from and going out over the data network links.

The VoIP application 145 includes or interfaces through a program module 147 for controlling operations of the vocoder 125. The vocoder control software 56 provides the executable code for the processor 103 to enable control over operations of the vocoder 45. For example, during a VoIP communication, the processor 103 operates the vocoder 125 to digitize and compress outgoing audio in a standard VoIP format. During such a communication, the processor 103 also operates the vocoder 125 to decompress and reconvert to analog audio information it has recovered from received IP packets.

The VoIP application 145 includes a program module 149 enabling the processor to perform packet interworking functions on compressed digital audio information. For outgoing audio, the digitized signals from the vocoder 125 are appropriately formatted and handed off to the TCP/IP stack 141 for encapsulation and transmission via the control module 143 and the physical transceiver 119. For incoming audio, the transceiver 119 supplies incoming data containing IP packets through the transceiver interface/control module 143, and payload data is received through the TCP/IP stack 141 and recovered by the program module 149 and supplied to the vocoder 125 for processing. The VoIP encoding/decoding and the attendant IP encapsulation and de-encapsulation will conform to an applicable VoIP standard.

In the example, the VoIP application software 145 also includes a program module 151 for call set-up control. Execution of this program causes the processor 103 to conduct signaling via the transceiver 117 and the data network, so as to establish and later tear down a voice communication session. The call set-up module 151, for example, may program the processor 103 to implement the H.323 protocol, the Session Initiation Protocol (SIP) or the Media Gateway Control Protocol (MGCP). Although not separately shown, other signaling protocol stacks may be implemented in the software 130 to provide the signaling to set-up a packet data communication session, e.g. through the access server 53 to the Internet 93.

Hence, for voice communications purposes, the application(s) 145 control call set-up as well as the encoding and decoding by the vocoder 125 and the packet encapsulation and de-encapsulation for wireless packet data communication via the transceiver 117.

Figure 3:
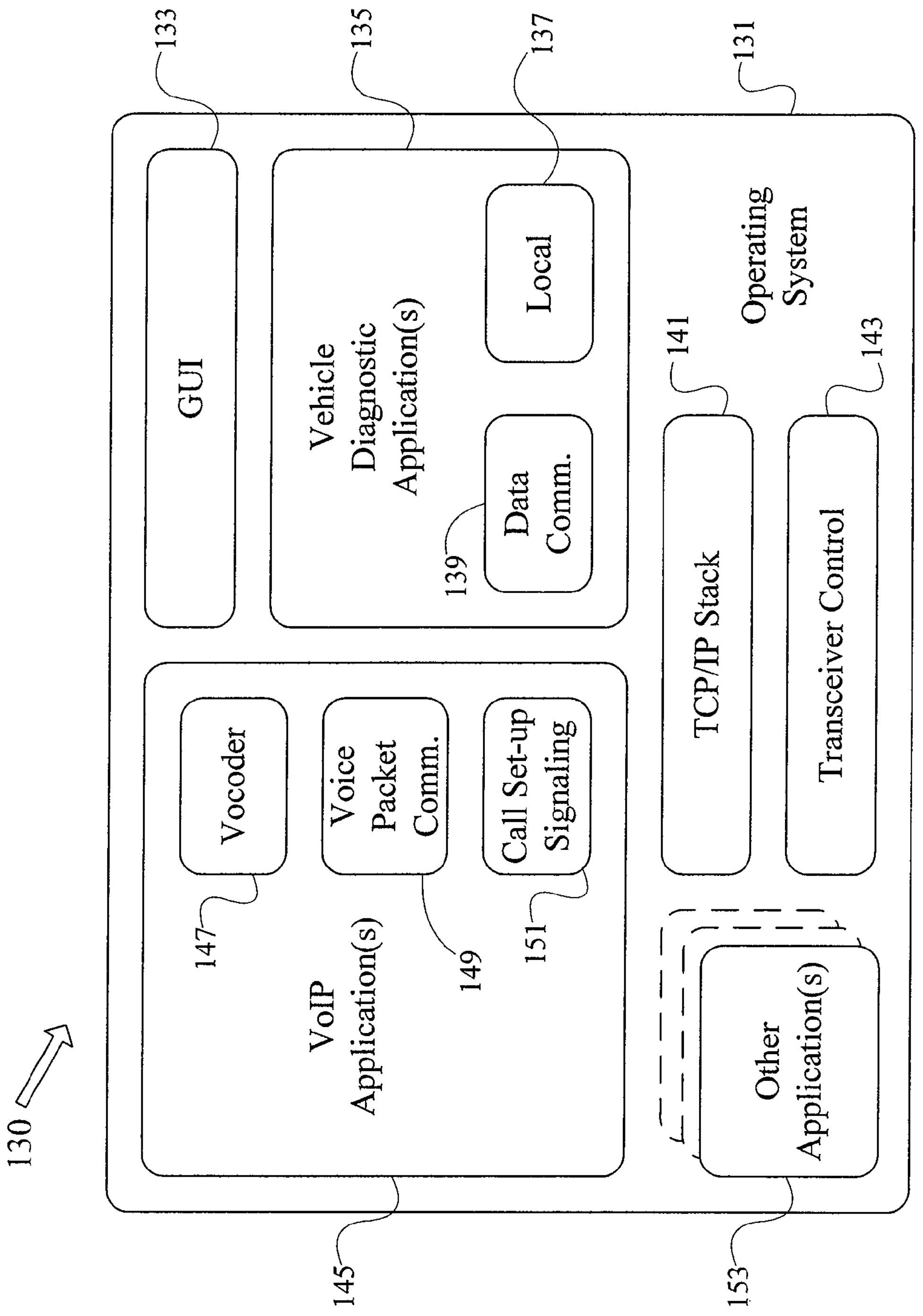
FIG. 3 is a diagram useful in explaining an example of programming that may be used in the vehicle diagnostic tool of FIG. 2.

Of course, the tool software 130 may include a variety of other applications, e.g. for e-mail, voice or data based instant messaging, browsing the world wide web, document processing, etc., represented generically by the other application(s) shown at 153 in FIG. 3.

At various times, the relevant programming 130 may reside on one or more of several different media. For example, the programming typically will be stored in any one or more of the tool memories 107-111, for upload to internal registers or memory and execution by the processor 103. At times some or all of the programming may reside on a hard disk or other type of storage device in a server 51 or 53 or other computer on the premises 11 or coupled to the Internet 93, before downloading to the tool 100 to install or upgrade the tool software. The programming also may reside on or be transported by other media for uploading into the tool 100, to essentially perform the installation and/or upgrade of the programming.

Hence, at different times all or portions of the executable code or data for any or all of the software elements 130 may reside in physical media or be carried by electromagnetic media or be transported via a variety of different media to program the particular implementation of the vehicle diagnostic tool 100. As used herein, terms such as computer or machine "readable medium" therefore refer to any medium that participates in providing instructions to a processor for execution. Such a medium may take many forms, including but not limited to, non-volatile media, volatile media, and transmission media (e.g. wires, fibers or the like) as well as signals of various types that may carry data or instructions between systems or between system components, e.g. via the Internet 93 and over the wired and wireless data links of the packet network within the premises 11.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A vehicle diagnostic and communication system for a vehicle service facility, comprising:

a data communication network configured for installation within the vehicle service facility;

a wireless access point coupled to the data communication network configured for installation within the vehicle service facility; and first and second vehicle diagnostic tools for use in the vehicle service facility, wherein each of the first and second vehicle diagnostic tools comprises:

(a) an interface configured to obtain diagnostic data from a vehicle in the vehicle service facility;

(b) at least one audio transducer configured for audible input and output;

(c) a vocoder configured to encode audio signals coming from the at least one audio transducer and to decode received encoded audio signals for the at least one audio transducer;

(d) a wireless packet data transceiver, configured for wireless packet data communication, with the wireless access point, of data relating to operation of the interface and two-way wireless packet data communication of the encoded audio signals;

(e) a processor configured to control operations of the vehicle diagnostic tool including communications via the wireless packet data transceiver;

(f) a memory;

(g) programming stored in the memory for execution by the processor, wherein the programming includes:

at least one vehicle diagnostic application to configure the processor to control operation of the interface to obtain diagnostic data from the vehicle and to cause the processor to perform diagnostic functions of the respective vehicle diagnostic tool including data processing on the data obtained from the interface to help identify a vehicle problem or to propose a remedial action and to control the communication of data relating to at least one of the diagnostic functions via the wireless packet data transceiver; and a voice communication application to configure the processor to control the vocoder and the wireless packet data transceiver for wireless packet data communication of the encoded audio signals, for two-way voice communication for a user of the respective vehicle diagnostic tool; and (h) a housing separate from the vehicle, enclosing the interface, processor, memory, at least one audio transducer, vocoder and wireless packet data transceiver, for configuring the respective tool for operation in the vehicle service facility in accord with the at least one vehicle diagnostic application and the voice communication application, wherein each of the first and second vehicle diagnostic tools is configured to enable communication with other vehicle diagnostic tools used in the vehicle service facility over the data communication network of the vehicle service facility, so as to enable a user of one vehicle diagnostic tool to communicate with a user of another vehicle diagnostic tool in the vehicle service facility.

2. The system of claim 1, wherein the voice communication application configures the respective tool to support two-way voice communication for the user of the respective vehicle diagnostic tool with the user of the other vehicle diagnostic tool via the data communication network.

3. The system of claim 1, further comprising at least one access server coupled to the data communication network of said system, for providing a two-way packet data communication link with a wide area data communication network for voice communication for each vehicle diagnostic tool via the wide area data communication network.

4. The system of claim 1, wherein the housing is configured to enable handheld operation of the respective tool for operation in accord with the at least one vehicle diagnostic application and the voice communication application.

5. The system of claim 1, wherein the interface comprises a diagnostic instrument.

6. The system of claim 5, wherein the diagnostic instrument comprises at least one instrument selected from the group consisting of:

an interface configured to receive image data from an image sensor;

a data interface configured for scanner communication with one or more on-board controllers in the vehicle;

a gas analyzer;

a digital volt-ohm meter; and a laboratory oscilloscope.

7. The system of claim 1, wherein the first vehicle diagnostic tool further comprises a display and at least one user data input.

8. The system of claim 1, wherein the first vehicle diagnostic tool further comprises an audio filter associated with the at least one audio transducer and the vocoder configured for the filtering of the audible input or the audible output.

9. The system of claim 1, further comprising:

a computer for use by office personnel within the vehicle service facility, the computer having a packet data communication interface coupled to the data communication network, and an audible input/output mechanism, wherein the computer is configured to provide two-way communication of audio information to and from the audible input/output mechanism over the data communication network, and wherein each of the first and second vehicle diagnostic tools is configured to enable two-way voice communication with the computer over the data communication network of the vehicle service facility, so as to enable a user of the first or second vehicle diagnostic tool to communicate with a user of the computer in the vehicle service facility.

10. The system of claim 1, wherein the first and second vehicle diagnostic tools are configured to enable peer-to-peer communication between each other.

* * * * *